May 1, 1962 G. F. MONTGOMERY 3,032,611

COMBINED FREQUENCY-PHASE MODULATION TELEGRAPH SYSTEM

Filed May 12, 1961

INVENTOR

George Franklin Montgomery

BY David Robbins

John C. Stahl

ATTORNEYS

United States Patent Office 3,032,611

Patented May 1, 1962

3,032,611
COMBINED FREQUENCY-PHASE MODULATION TELEGRAPH SYSTEM

George Franklin Montgomery, 517 23rd St., Washington 7, D.C.

Filed May 12, 1961, Ser. No. 109,787
4 Claims. (Cl. 178—66)
(Granted under Title 35, U.S. Code (1952), sec. 266)

The invention described herein may be manufactured and used by or for the Government of the United States for governmental purposes without the payment to me of any royalty thereon, in accordance with the provisions of 35 United States Code (1952) section 266.

This invention relates to a telegraph system in which the carrier wave is frequency and phase modulated.

Frequency shift telegraph systems, in which the carrier wave is switched from one to another of two or more frequencies in accordance with a message to be transmitted, are well known in the art. In the simplest of these systems, the frequencies of the transmitted carrier wave are two, one being the mark and the other the space frequency, thus permitting message transmission in a suitable binary code. The received carrier wave is examined by a device capable of discriminating between the two frequencies, for example, a pair of frequency selective filters, one tuned to the mark and the other to the space frequency. The amplitudes of the oscillations in these two filters are compared, and the filter yielding the greater amplitude indicates whether a mark or a space was transmitted.

Phase shift telegraph systems, in which a carrier wave of fixed frequency is switched from one to another of two or more phases in accordance with the message to be transmitted, are also well known in the art. The received carrier wave is examined by a device capable of discriminating between two or more phases, which may comprise synchronous rectifiers, for example, each supplied with a local wave of carrier frequency and a phase corresponding with one of the phases selected for transmission. The output of the device, dependent upon the phase of the received carrier wave, indicates whether a mark or a space was transmitted.

It is an object of the present invention to employ elements of these two systems in combination in such a way that each is independent of the other, thereby permitting two messages to be transmitted and received on the same carrier wave.

Another object is to provide a carrier wave telegraph system wherein two independent messages are transmitted and received using the same carrier wave without requiring an increase in power or bandwidth of the carrier wave.

These and other objects are accomplished by generating a plurality of oscillations, each having a different frequency, and selecting a sequence of the oscillations in dependency upon a message to be transmitted. Each of the oscillations in the sequence is provided with a phase dependent upon another message to be transmitted. At the receiver, a first series of signals is developed in dependency upon the frequencies of the oscillations and a second series in dependency upon the phases of the oscillations in the sequence.

It is understood that when, for example, the system is to be provided with an error detecting device, the second message may be a delayed replica of the first. At the receiver, the elements of the first and second message may then be compared to determine whether an error occurred in transmission.

Figure 1:
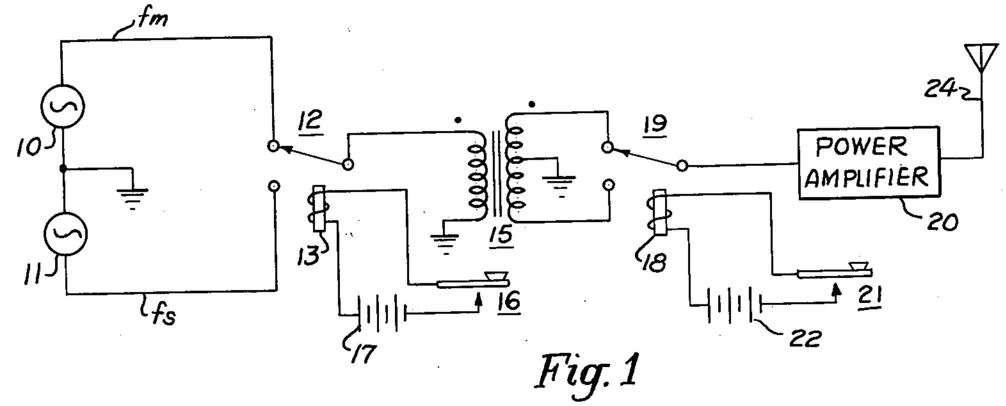
FIG. 1 is a transmitter.

Referring to FIG. 1, the carrier wave is generated by frequency sources 10 and 11, the frequency of source 10 being the mark frequency $f_m$ and the frequency of source 11 being the space frequency $f_s$. The carrier wave frequency may be considered as the average of the mark and space frequencies. When solenoid 13 is released, the arm of switch 12 is in the position shown in FIG. 1, so that frequency $f_m$ is applied to the primary winding of transformer 15. When key 16 is closed, a circuit is completed through the key, battery 17 and solenoid 13, energizing the solenoid. The arm of switch 12 then moves to the lower position in FIG. 1 and frequency $f_s$ is applied to the primary of transformer 15. Two outputs are available at the terminals of the balanced secondary winding of transformer 15, which outputs are in phase opposition. For convenience, these will be denominated as phases 1 and 2, the former representing a mark and the latter a space. When solenoid 18 is released, a carrier wave of frequency $f_m$ or $f_s$ and phase 1 is applied through the arm of switch 19 to power amplifier 20. When key 21 is closed, a circuit is completed through the key, battery 22, and solenoid 18, energizing the solenoid so that the arm of switch 19 is moved to the lower position in FIG. 1 and a carrier wave having a frequency $f_m$ or $f_s$ and phase 2 is applied to power amplifier 20. The carrier wave thus applied to the power amplifier is transmitted to a distant station by way of antenna 24. It is readily apparent that instead of the antenna a transmission line may be used.

Figure 2:
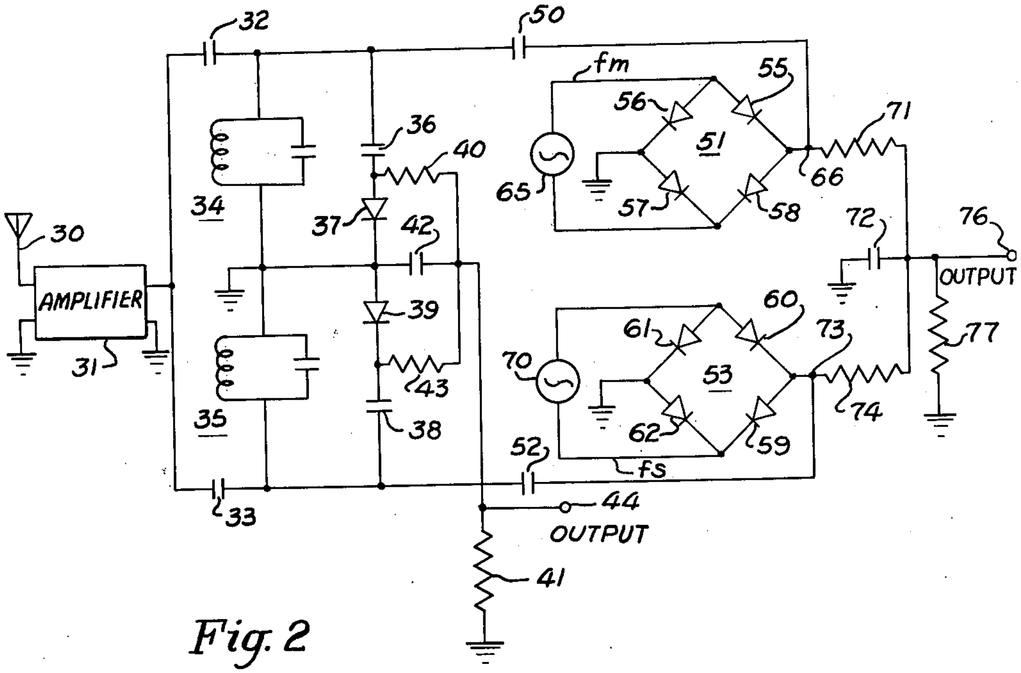
FIG. 2 is a receiver in an embodiment of the present invention.

Referring to FIG. 2, the carrier wave is received on antenna 30 which is connected to amplifier 31. The output of the amplifier is coupled through capacitors 32, 33 to tuned circuits 34, 35, respectively. Circuit 34 is tuned to frequency $f_m$ and circuit 35 is tuned to frequency $f_s$. One side of each tuned circuit is grounded. Capacitor 36 and diode 37 are connected in series across tuned circuit 34, while capacitor 38 and diode 39 are connected in series across tuned circuit 35 in such a manner that the cathode of diode 37 and the anode of diode 39 are grounded. Resistor 40 is positioned between the anode of diode 37 and one side of load resistor 41; the other side of resistor 41 is grounded. Similarly, capacitor 42 is positioned between the anode of diode 39, and resistor 43 is positioned between the cathode of diode 39 and the ungrounded side of resistor 41. Finally, output terminal 44 is connected to the ungrounded side of resistor 41. Tuned circuits 34, 35 in combination with rectifiers 37, 39 and their associated components comprise one type of frequency discriminator. Other types of frequency discriminators may, of course, be used.

The output of amplifier 31, applied through capacitors 32, 50 across a diagonal of synchronous rectifier bridge 51, is also applied through capacitors 33, 52 across a diagonal of synchronous rectifier bridge 53. The outputs of sources 65, 70 are applied across the other diagonals of bridges 51, 53, respectively. Bridge 51 comprises diodes 55 to 58, and bridge 53 comprises diodes 59 to 62. Sources 65 and 70 provide signals having frequencies $f_m$ and $f_s$, respectively, which are adjusted with an arrangement, not shown, to phase synchronism with the received phases corresponding to the frequencies of sources 10, 11. Arrangements for making these adjustments are well known in the art.

Terminal 66, located between the cathode of diode 55 and the anode of diode 58, is grounded through resistor 71 and capacitor 72, while terminal 73, located between the cathode of diode 60 and the anode of diode 59, is grounded through resistor 74 and capacitor 72. Finally, capacitor 72 is connected to output terminal 76, and load resistor 77 is connected across the latter and ground.

In an example of operation, if a mark is to be sent in the first message and a space in the second, key 16 is released and key 21 is depressed. A signal having a frequency $f_m$ of phase 2 is then transmitted, received on antenna 30, and coupled to tuned circuits 34, 35. Because the signal is selected by circuit 34 and rejected, but not perfectly, by circuit 35, a larger alternating voltage is applied to diode 37 than to diode 39. Consequently, negative current flows through resistor 40 having a magnitude sufficient to overbalance the positive current flowing in resistor 43, and a negative voltage is developed on output terminal 44, indicating that a mark in the first message was transmitted. Capacitor 42 operates in conjunction with resistors 40 and 43 to filter the alternating voltage components of higher frequencies so that only a low frequency or D.C. signal appears on output terminal 44.

The received signal passes through capacitor 50 to synchronous rectified bridge 51. Since the signal is of frequency $f_m$ and phase 2, it is in phase with the output of source 65 so that during the positive half-cycle of source 65, rectifiers 55 to 58 are conductive and the signal, applied to terminal 66, is shorted to ground. During the next half-cycle, corresponding to the negative half-cycle of the received signal, bridge 51 is open, hence a negative current flows through resistor 71. Meanwhile, tuned circuit 35 does not reject frequency $f_m$ perfectly, and a signal of small magnitude is fed through capacitor 52 to receifier bridge 53. Source 70, however, generates a carrier wave of a different frequency than the received signal so that the average voltage produced at terminal 73 is zero. Therefore, the net signal appearing on output terminal 73 is a negative voltage, indicating that a space in the second message was transmitted.

Obviously, many variations and modifications will be apparent to one skilled in the telegraph art. For example, instead of two frequencies and two phases, one could use $n$ frequencies and $m$ phases to provide a choice of $(m+n)$ symbols to code the message or messages to be transmitted. Accordingly, it is understood that within the scope of the appended claims, the invention may be practiced otherwise than as specifically described.

What is claimed is:

1. In a telegraph system, a transmitter comprising: means for generating a plurality of oscillations, each having a different frequency, means for selecting a sequence of said oscillations in depedency upon a message to be transmitted, and means for providing each oscillation in the sequence with a desired phase modulation.

2. In a telegraph system, a transmitter comprising: means for generating a plurality of oscillations, each having a different frequency, means for selecting a sequence of said oscillations in dependency upon a message to be transmitted, and means for providing each oscillation in the sequence with one of a plurality of phases in dependency upon a message to be transmitted.

3. In a carrier wave telegraph system, a receiver comprising: means for receiving a signal frequency modulated and phase modulated in dependency upon at least one transmitted message, and means for providing a first signal in dependency upon the frequency modulation and a second signal in dependency upon the phase modulation of the received signal.

4. In a telegraph system, a transmitter comprising: means for frequency modulating a carrier wave with any one of a plurality of oscillations, each having a different frequency, means for selecting a modulating oscillation in dependency upon a message to be transmitted, and means for providing the selected oscillation with a desired phase in dependency upon a message to be transmitted; and a receiver comprising: means for providing a first signal in dependency upon the frequency of the selected oscillation and a second signal in dependency upon the phase modulation of said selected oscillation.

No references cited.